US011962974B2

(12) United States Patent
Frieding et al.

(10) Patent No.: US 11,962,974 B2
(45) **Date of Patent: *Apr. 16, 2024**

(54) SYSTEMS AND METHODS FOR CUSTOMIZING AUDITORY DEVICES

(71) Applicant: Cochlear Limited, Macquarie University (AU)

(72) Inventors: Jan Patrick Frieding, Grose Vale (AU); Carl Uvesten, Partille (SE); Fredrik Breitholtz, Hovås (SE); Nicholas Feeney, Kullavik (SE)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,726

(22) Filed: Oct. 11, 2022

(65) Prior Publication Data

US 2023/0089706 A1 Mar. 23, 2023

Related U.S. Application Data

(63) Continuation of application No. 17/268,558, filed as application No. PCT/IB2019/001102 on Oct. 14, 2019, now Pat. No. 11,503,413.

(60) Provisional application No. 62/751,096, filed on Oct. 26, 2018.

(51) Int. Cl.
*H04R 25/00* (2006.01)

(52) U.S. Cl.
CPC ........... *H04R 25/30* (2013.01); *H04R 25/554* (2013.01); *H04R 25/70* (2013.01); *H04R 25/606* (2013.01); *H04R 2225/39* (2013.01); *H04R 2225/55* (2013.01); *H04R 2460/13* (2013.01)

(58) Field of Classification Search
CPC ............ H04R 2225/39; H04R 2225/55; H04R 2460/13; H04R 25/30; H04R 25/554; H04R 25/606; H04R 25/70
USPC ............................................................ 381/60
See application file for complete search history.

(56) References Cited

U.S. PATENT DOCUMENTS

| | | | |
|---|---|---|---|
| 7,738,667 | B2 | 6/2010 | Bramslow et al. |
| 8,238,592 | B2 | 8/2012 | Norgaard et al. |
| 8,532,317 | B2 | 9/2013 | Dilon et al. |
| 8,565,908 | B2 | 10/2013 | Sabin et al. |
| 8,588,442 | B2 | 11/2013 | Schmitt et al. |

(Continued)

FOREIGN PATENT DOCUMENTS

| | | | |
|---|---|---|---|
| EP | 3035710 | A2 | 6/2016 |

OTHER PUBLICATIONS

International Search Report and Written Opinion in counterpart International Application No. PCT/IB2019/001102, dated Feb. 13, 2020, 7 pages.

*Primary Examiner* — Phylesha Dabney
(74) *Attorney, Agent, or Firm* — Edell, Shapiro & Finnan, LLC

(57) ABSTRACT

Systems and methods are provided for customizing an auditory prosthesis or other medical device. Customizing the auditory prosthesis includes obtaining and evaluating system data. The system data includes data from multiple sensors, including one or more sensors of an auditory prosthesis and one or more sensors of a recipient computing device. Based on the evaluation of the system data, a target behavior is determined, such as operating the auditory prosthesis in a particular sonic environment or with particular auditory prosthesis settings.

21 Claims, 8 Drawing Sheets

(56) References Cited

U.S. PATENT DOCUMENTS

| | | | |
|---|---|---|---|
| 8,605,923 B2 | 12/2013 | Goorevich et al. | |
| 8,718,288 B2 | 5/2014 | Woods et al. | |
| 9,332,358 B2 | 5/2016 | Waldmann et al. | |
| 9,403,003 B2 | 8/2016 | Calle et al. | |
| 9,479,877 B2 | 10/2016 | Litvak et al. | |
| 9,549,268 B2 | 1/2017 | Barthel et al. | |
| 2002/0183648 A1 | 12/2002 | Hou | |
| 2009/0154741 A1 | 6/2009 | Woods et al. | |
| 2013/0243227 A1 | 9/2013 | Kinsbergen et al. | |
| 2015/0023512 A1 | 1/2015 | Shennib | |
| 2016/0066107 A1* | 3/2016 | Recker ................. | H04R 25/505<br>463/31 |
| 2016/0302013 A1 | 10/2016 | Andersson | |
| 2017/0360364 A1 | 12/2017 | Heasman et al. | |

* cited by examiner

SYSTEMS AND METHODS FOR CUSTOMIZING AUDITORY DEVICES

This application is a continuation of U.S. patent application Ser. No. 17/268,558, filed Feb. 15, 2021, which is a National Stage Entry of PCT/IB2019/001102, filed Oct. 14, 2019, which claims the benefit of priority to U.S. Provisional Application No. 62/751,096, filed Oct. 26, 2018, the entire disclosure of which is incorporated by reference in its entirety.

BACKGROUND

Hearing loss, which can be due to many different causes, is generally of two types: conductive and sensorineural. In many people who are profoundly deaf, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate their auditory nerves in other ways (e.g., electrical, optical, and the like). Cochlear implants are often proposed when the sensorineural hearing loss is due to the absence or destruction of the cochlea hair cells, which transduce acoustic signals into nerve impulses. Auditory brainstem implants might also be proposed when a person experiences sensorineural hearing loss if the auditory nerve, which sends signals from the cochlear to the brain, is severed or not functional.

Conductive hearing loss occurs when the normal mechanical pathways that provide sound to hair cells in the cochlea are impeded, for example, by damage to the ossicular chain or the ear canal. Individuals suffering from conductive hearing loss can retain some form of residual hearing because some or all of the hair cells in the cochlea function normally.

Individuals suffering from conductive hearing loss often receive a conventional hearing aid. Such hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to conventional hearing aids, which rely primarily on the principles of air conduction, certain types of hearing prostheses commonly referred to as bone conduction devices, convert a received sound into vibrations. The vibrations are transferred through the skull to the cochlea causing motion of the perilymph and stimulation of the auditory nerve, which results in the perception of the received sound. Bone conduction devices are suitable to treat a variety of types of hearing loss and can be suitable for individuals who cannot derive sufficient benefit from conventional hearing aids.

SUMMARY

Technology disclosed herein includes systems, apparatuses, devices, and methods that facilitate functionality of medical devices, such as auditory prostheses, by providing improvements to the customization of the devices.

In an example, there is a system for customizing the operation of an auditory prosthesis, the system includes an auditory prosthesis wearable by a recipient. The auditory prosthesis has at least one auditory prosthesis sensor. The system further includes a recipient computing device configured to be communicatively coupled to the auditory prosthesis. The system also includes a server configured to be communicatively coupled to the recipient computing device. The server is further configured to obtain system data, wherein the system data includes auditory prosthesis sensor data produced by the at least one auditory prosthesis sensor; evaluate the system data; determine a target behavior based on the evaluation of the system data; determine an incentive for the target behavior; cause the recipient computing device to provide a notification that includes a description of the incentive; monitor for a change in the operation of the auditory prosthesis that satisfies the target behavior; and responsive to determining that the change in the operation of the auditory prosthesis that satisfies the target behavior occurred, fulfilling the incentive.

In another example, there is a method including obtaining auditory prosthesis sensor data produced by at least one auditory prosthesis sensor of an auditory prosthesis; obtaining recipient computing device sensor data produced by at least one recipient computing device sensor of a recipient computing device; evaluating the auditory prosthesis sensor data and the recipient computing device sensor data; determining a target behavior based on the evaluating; determining an incentive for the target behavior; and causing the recipient computing device to provide a notification. In an example, the notification includes a description of the incentive.

In a further example, there is a non-transitory computer readable medium comprising instructions that, when executed by one or more processors, cause the one or more processors to perform operations. The operations include automatically obtaining first system data regarding an auditory prosthesis of a recipient from a recipient computing device of the recipient; evaluating the first system data; determining that the first system data does not satisfy a threshold; responsive to determining that the first system data does not satisfy the threshold, providing an incentive; automatically obtaining second system data from the recipient computing device; evaluating the second system data; and determining that the second system data satisfies the threshold. The operations further include, responsive to determining that the second system data satisfies the threshold, fulfilling the incentive; sending a first notification to the recipient computing device regarding the incentive; and sending a second notification to a clinician computing device regarding the incentive.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
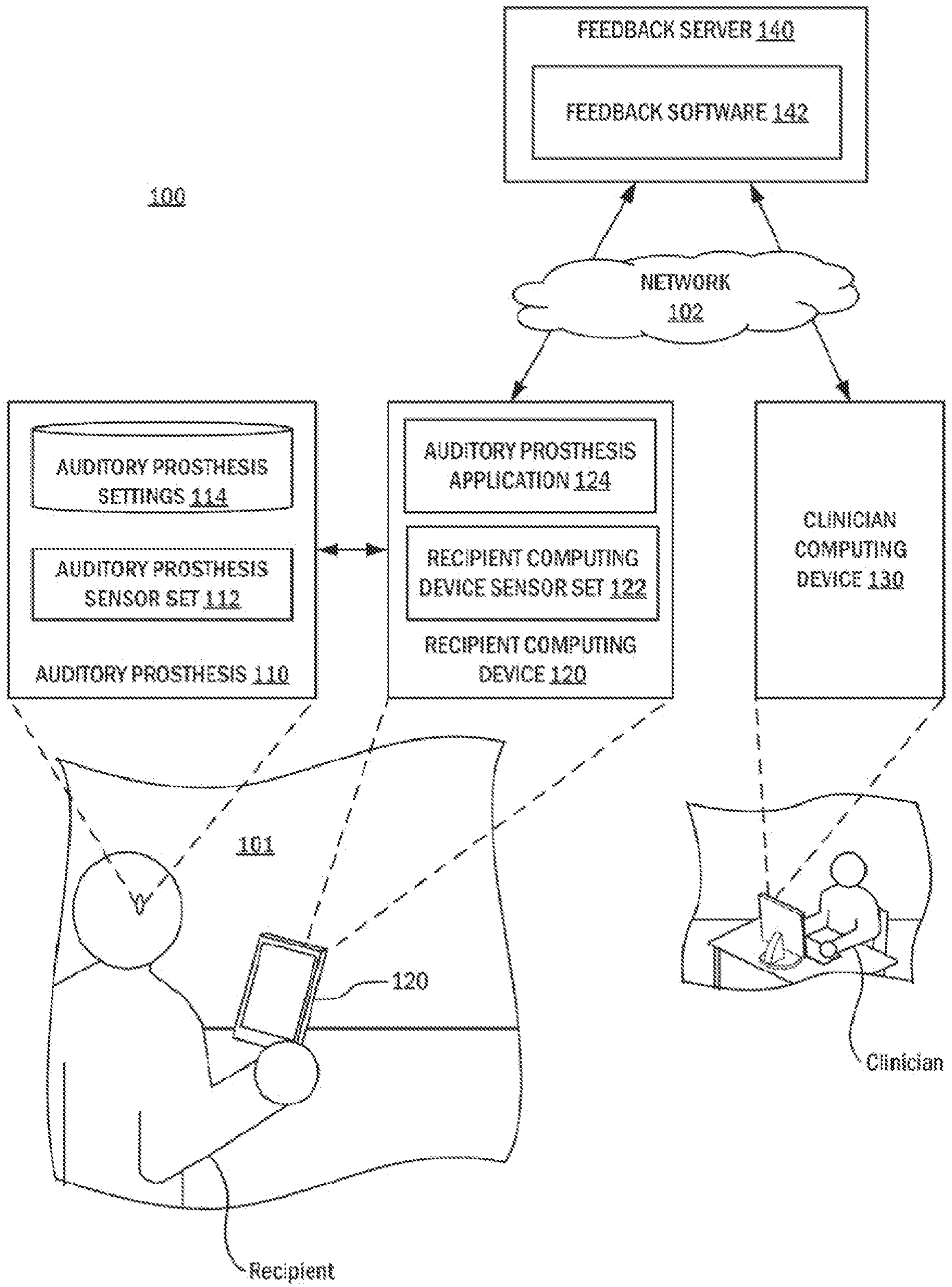
FIG. 1 illustrates an example auditory prosthesis fitting system that includes an auditory prosthesis that can benefit from the use of technologies described herein.

Auditory prostheses, such as cochlear implants, are often tuned to match a recipient's needs (e.g., comfort and performance). For instance, a clinician (e.g., an audiologist) customizes an auditory prosthesis of a recipient based on hearing tests and subjective input from the recipient. The recipient can often also customize the auditory prosthesis directly. But the customizations, whether by the clinician or the recipient, usually rely on obtaining feedback from the recipient. Further, such customizations are limited by the environments in which the customization takes place. For instance, the customizations are often performed in a clinic or at home. While such situations are appropriate for initial customization of the auditory prosthesis, limiting customizations to such environments can fail to address the wide gamut of sonic environments in which the auditory prosthesis will operate. And when the recipient experiences a situation where the auditory prosthesis functions suboptimally, the situation may not be suitable for modifying the auditory prosthesis (e.g., while the auditory prosthesis is being used at a movie theater). And the opportunities for formal customization sessions may be spaced far apart, such as at yearly checkups, where a recipient may be unable to recall past performance. In this manner, while it is beneficial to customize how the auditory prosthesis functions, it can be challenging to do so using traditional techniques.

Further, customization of the auditory prosthesis can depend on how user friendly and engaging the customization process is to the recipient. If the process does not sufficiently engage the recipient, then the customization of the auditory prosthesis will ultimately suffer. This can be especially true in situations where a change to new settings may initially seem suboptimal to the recipient, but once the recipient acclimates to new settings, the auditory prosthesis performs better than before (e.g., by providing an increased dynamic range). Similarly, the recipient operating the auditory prosthesis in a variety of sonic environments can help the recipient acclimate to using the auditory prosthesis in those environments and discover settings that are suitable for those environments. Therefore improvements to the fitting process and the ability of the auditory prosthesis (and associated systems) to interact with the recipient ultimately improve the functionality of the auditory prosthesis.

Disclosed technology addresses challenges in customizing the functioning of an auditory prosthesis in at least two ways: (1) by using system data from multiple sensors in the customization process and (2) by providing improved interaction with a recipient via the use of incentives.

Regarding (1), multiple sensors can obtain data regarding the auditory prosthesis, the environment in which the auditory prosthesis operates, and from the recipient. In an example, the auditory prosthesis includes one or more microphones, antennas (e.g., FM receivers), and scene classifiers, among other sensors. These auditory prosthesis sensors are usable as objective inputs on which customization of the auditory prosthesis is based. Additionally, the recipient's interactions with the auditory prosthesis can further serve as useful data. Such interactions can include data regarding the removal of the auditory prosthesis, activating elements of the auditory prosthesis (e.g., pressing buttons), and using an application associated with the auditory prosthesis, among others. Sensors of other devices can also be useful. For instance, many recipients carry mobile devices (e.g., cell phones, smart watches, and heart rate monitors), which can be referred to as "recipient computing devices". These recipient computing devices often have sensors that can be useful for customizing the auditory prosthesis, such as accelerometers, gyroscopes, satellite location trackers (e.g., via the Global Positioning System), cameras, biosensors (e.g., heart rate, blood pressure, and temperature sensors), and light sensors. These sensors can further add objective input to optimizing the auditory prosthesis. Both the auditory prosthesis sensors and the recipient computing device sensors can be utilized in real time to determine an environment in which the auditory prosthesis is operating, as well as infer characteristics of the recipient (e.g., state of mind, state of being, and health). Such data can be used to customize the auditory prosthesis. For instance, the sensor data can reveal that the recipient is exercising outdoors (e.g., based on heart rate sensor data and location data) and automatically adjust settings of the auditory prosthesis to reduce the effect of wind noise. Such data can be used to obtain feedback regarding performance of the auditory prosthesis during the activity, such as whether the recipient felt that the auditory prosthesis performed adequately with respect to wind noise. Further, the sensor data can be used to suggest settings to the recipient during the activity. For instance, in order for the auditory prosthesis to interact with the recipient in an improved manner, the auditory prosthesis (or a companion application thereof) may suggest the change rather than automatically making the adjustment.

Regarding (2), the improved user interaction includes improving how the customization process interacts with the recipient in order to customize the performance of the auditory prosthesis. This can include requesting feedback from the recipient contemporaneously with the occurrence of events (e.g., as detected by the multiple sensors). Such contemporaneous input from the recipient can be used to configure the auditory prosthesis and track performance of the device between scheduled fitting sessions and in a diverse range of environments.

Disclosed technology includes the use of a wide variety of available data sources across multiple devices to determine situations in which to gather data regarding auditory prosthesis performance. In this manner, the technology allows for continuous and proactive evaluation of the auditory prosthesis performance with current settings. The evaluation is able to be performed over time and in a variety of sonic environments, without being limited traditional auditory prosthesis fittings that occur in a clinical setting.

Disclosed technology further includes improvements to the functionality of the fitting system to better interact with the recipient to further customize auditory prosthesis performance. In some implementations, the auditory prosthesis customization is not part of a prescribed learning or training path set in advance by a clinician. Instead, the auditory prosthesis is customized according how the auditory prosthesis functions in a variety of sonic environments and makes use of a variety of available customizations. To encourage the use and evaluation of the different settings, in some examples, the auditory prosthesis feeds back the level and quality of the usage pattern to the recipient to improve the user interface of the auditory prosthesis in a way that encourages sufficient recipient engagement to properly customize the auditory prosthesis. By improving the functionality of the auditory prosthesis to encourage the recipient to engage in the fitting process, the fitting system is improved and provides tangible benefits by customizing the performance of the auditory prosthesis in a variety of sonic environments.

System

FIG. 1 illustrates an example auditory prosthesis fitting system 100 that includes an auditory prosthesis 110 that can benefit from the use of technologies described herein. The system 100 further includes a recipient computing device 120, a clinician computing device 130, and a feedback server 140, which are connected over a network 102.

The network 102 is a computer network, such as the Internet, that facilitates the communication of data among computing devices connected to the computer network.

As illustrated, the auditory prosthesis 110 and the recipient computing device 120 are operated by the recipient in an environment 101. The environment 101 defines the conditions in which the auditory prosthesis 110 and the recipient computing device 120 operate. In many examples herein, the environment 101 includes the sonic conditions in which the auditory prosthesis 110 functions. Such sonic conditions can include, for example, a loudness of noise (e.g., whether the environment 101 is loud or quiet), a number of sources of noise (e.g., a crowded restaurant with many sources of noise or a one-on-one conversation with fewer sources of noise) and a kind of noise (e.g., music or speech). The environment 101 can also define an activity in which the recipient is engaged, such as a conversation or exercise. The environment 101 can affect the operation of the auditory prosthesis 110 and the auditory prosthesis 110 can be customized to operate differently in different environments 101.

The auditory prosthesis 110 is a medical apparatus relating to a recipient's auditory system, such as a cochlear implant or bone conduction devices (e.g., percutaneous bone conduction devices, transcutaneous bone conduction devices, active bone conduction devices, and passive bone conduction devices), and middle ear stimulators, among others. The auditory prosthesis 110 can take any of a variety of forms and examples are such forms are described in more detail in FIG. 4 (showing a cochlear implant), FIG. 5 (showing a percutaneous bone conduction device), and FIG. 6 (showing a transcutaneous bone conduction device). In the illustrated example, the auditory prosthesis includes an auditory prosthesis sensor set 112 and operates according to auditory prosthesis settings 114.

The auditory prosthesis sensor set 112 is a collection of one or more components of the auditory prosthesis 110 that obtain data, such as data regarding the environment 101, the auditory prosthesis 110, or the recipient. In many examples, the auditory prosthesis sensor set 112 include a microphone. The auditory prosthesis sensor set 112 can include one or more other sensors, such as one or more accelerometers, gyroscopic sensors, location sensors, telecoils, biosensors (e.g., heart rate or blood pressure sensors), and light sensors, among others. The auditory prosthesis sensor set 112 can include components disposed within a housing of the auditory prosthesis 110 as well as devices electrically coupled to the auditory prosthesis 110 (e.g., via wired or wireless connections). In examples, the auditory prosthesis sensor set 112 includes a remote device connected to the auditory prosthesis 110 via an FM (Frequency Modulation) connection, such as a remote microphone (e.g., a COCHLEAR TRUE WIRELESS MINI MICROPHONE2+), a television audio streaming device, or a phone clip device, among other devices having FM transmission capabilities. The auditory prosthesis sensor set 112 can further include sensors that obtain data regarding usage of the auditory prosthesis 110, such as software sensors operating on the auditory prosthesis 110 that track: when the auditory prosthesis 110 is worn by the recipient, when the auditory prosthesis 110 (e.g., an external portion thereof) is removed from the recipient, when one or more of the auditory prosthesis settings 114 are modified, and how long the auditory prosthesis 110 is operated using particular settings of the auditory prosthesis settings 114, among other data.

In examples, the auditory prosthesis sensor set 112 can further include a scene classifier. A scene classifier is software that obtains data regarding the environment 101 (e.g., from one or more other sensors of the auditory prosthesis sensor set 112) and determines a classification of the environment 101. Classifications can include, for example, speech, noise, and music, among other classifications. The auditory prosthesis 110 can then use the classification to automatically switch the auditory prosthesis settings 114 to suit the environment 101. An example scene classifier is described in US 2017/0359659, filed Jun. 9, 2016, and entitled "Advanced Scene Classification for Prosthesis", which is incorporated by reference herein in its entirety for any and all purposes. The classification can serve as useful data on which customization of the auditory prosthesis 110 is based.

The auditory prosthesis settings 114 are one or more parameters having values that affect how the auditory prosthesis 110 operates. For instance, the auditory prosthesis settings 114 can include a map having minimum and maximum stimulation levels for frequency bands of stimulation channels. The mapping is then used by the auditory prosthesis 110 to control an amount of stimulation to be provided. For instance, where the auditory prosthesis 110 is a cochlear implant, the mapping affects which electrodes of the cochlear implant to stimulate and in what amount based on a received sound input. In some examples, the auditory prosthesis settings 114 include two or more predefined groupings of settings selectable by the recipient. One of the two or more predefined groupings of settings may be a default setting.

The auditory prosthesis settings 114 can also include sound processing settings that modify sound input before it is converted into a stimulation signal. Such settings can include, for example, particular audio equalizer settings can boost or cut the intensity of sound at various frequencies. In examples, the auditory prosthesis settings 114 can include a minimum threshold for which received sound input causes stimulation, a maximum threshold for preventing stimulation above a level which would cause discomfort, gain parameters, loudness parameters, and compression parameters. The auditory prosthesis settings 114 can include settings that affect a dynamic range of stimulation produced by the auditory prosthesis 110. As described above, many of the auditory prosthesis settings 114 affect the physical operation of the auditory prosthesis 110, such as how the auditory prosthesis 110 provides stimulation to the recipient in response to sound input received from the environment 101.

The recipient computing device 120 is a computing device associated with the recipient of the auditory prosthesis 110. In many examples, the recipient computing device 120 is a cell phone, smart watch, or heart rate monitor, but can take other forms. As illustrated, the recipient computing device 120 includes a recipient computing device sensor set 122.

The recipient computing device sensor set 122 is group of one or more components of the recipient computing device 120 that obtains data. The recipient computing device sensor set 122 can include one or more sensors, such as microphones, accelerometers, gyroscopic sensors, location sensors, biosensors (e.g., heart rate or blood pressure sensors), and light sensors, among others. The recipient computing device sensor set 122 can include components disposed within a housing of the recipient computing device 120 as well as devices electrically coupled to the recipient computing device 120 (e.g., via wired or wireless connections). In some examples, the recipient computing device sensor set 122 includes software sensors, such as software that obtains data from one or more data streams (e.g., audio streamed from the recipient computing device 120 to the auditory prosthesis 110). The recipient computing device sensor set 122 can further include sensors that obtain data regarding how the recipient computing device 120 itself is being used.

In examples, the recipient computing device 120 includes an auditory prosthesis application 124 that operates on the recipient computing device 120 and cooperates with the auditory prosthesis 110. For instance, the auditory prosthesis application 124 can control the auditory prosthesis 110 (e.g., based on input received from the recipient), monitor usage of the auditory prosthesis 110, and obtain data from the auditory prosthesis 110. The recipient computing device 120 can connect to the auditory prosthesis 110 using, for example, a wireless radiofrequency communication protocol (e.g., BLUETOOTH). The auditory prosthesis application 124 transmits or receives data from the auditory prosthesis 110 over such a connection. The auditory prosthesis application 124 can also stream audio to the auditory prosthesis 110, such as from a microphone of the recipient computing device sensor set 122 or an application running on the recipient computing device 120 (e.g., a video or audio application). In examples, the auditory prosthesis application 124 functions as part of the recipient computing device sensor set 122 by obtaining data regarding the auditory prosthesis 110.

The clinician computing device 130 is a computing device used by a clinician. A clinician is a medical professional, such as an audiologist. In an example, the clinician is a medical professional that provides care or supervision for the recipient. The clinician computing device 130 includes one or more software programs usable to monitor the auditory prosthesis 110, such as customizations thereof.

The feedback server 140 is a server remote from the auditory prosthesis 110, recipient computing device 120, and the clinician computing device 130. The feedback server 140 is communicatively coupled to the recipient computing device 120 and the clinician computing device 130. In many examples, the feedback server 140 is indirectly communicatively coupled to the auditory prosthesis 110 through the recipient computing device 120 (e.g., via the auditory prosthesis application 124). In some examples, the feedback server 140 is directly communicatively coupled to the auditory prosthesis 110. The feedback server 140 includes feedback software 142.

The feedback software 142 is software operable to perform one or more operations described herein, such as operations that customize the auditory prosthesis 110. The feedback software 142 can customize the auditory prosthesis 110 based on feedback from the recipient or the clinician. The feedback server 140 can further provide an improved user interface by which a recipient configures the auditory prosthesis 110. As illustrated, the feedback software 142 operates on the feedback server 140. In other examples, the feedback software 142 can be operated elsewhere or in multiple different locations. For instance, the feedback software 142 can be operated on the recipient computing device 120, the clinician computing device 130, or both. In examples, the feedback software 142 can be operated offline.

The components of the system 100 can cooperate to perform a method that improves the performance of the auditory prosthesis 110. An example of such a method is described below in relation to FIG. 2.

Method

Figure 2A:
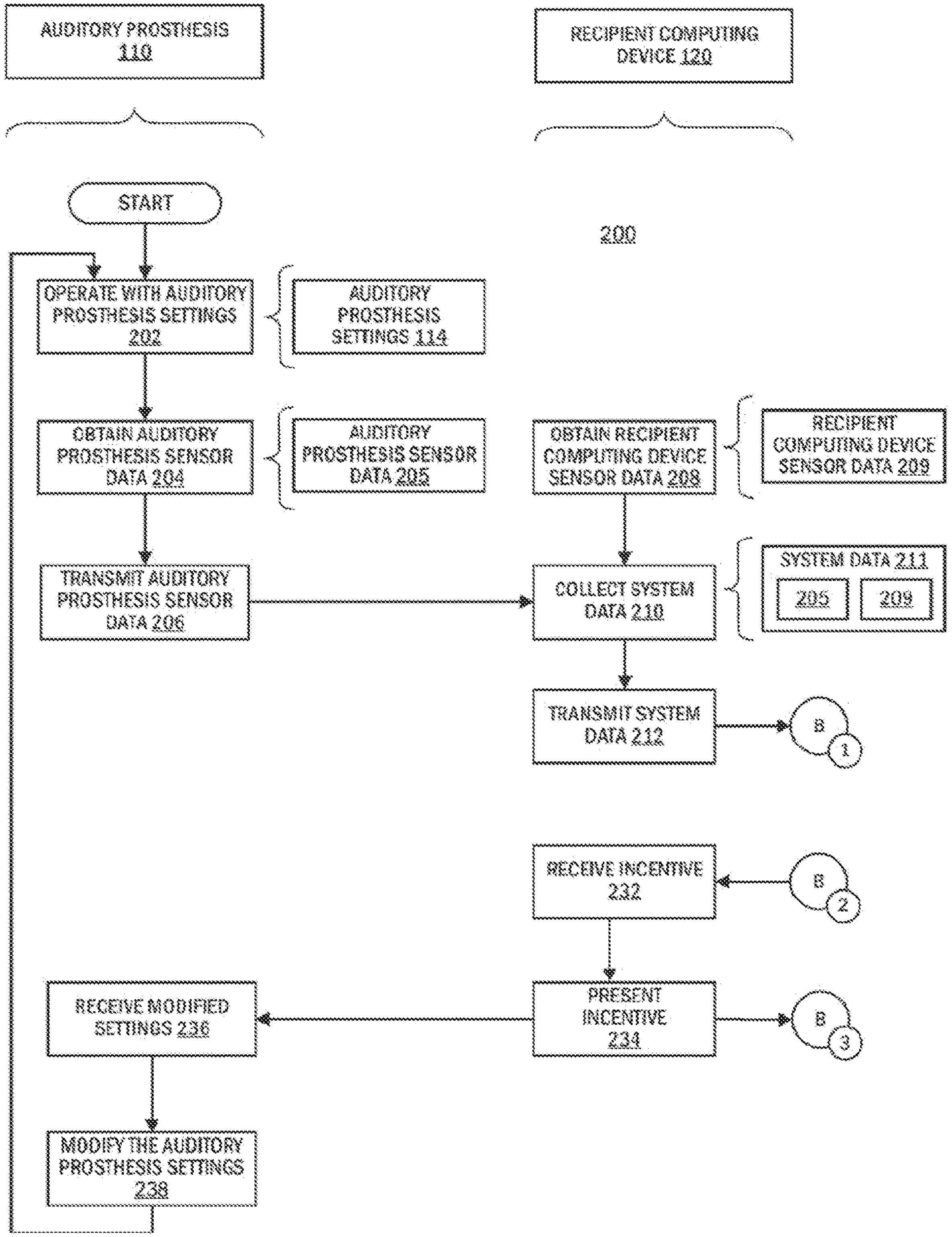
FIG. 2, which is made up of FIG. 2A and FIG. 2B, illustrates a method for improving the performance the auditory prosthesis by modifying the auditory prosthesis settings.
Figure 2B:
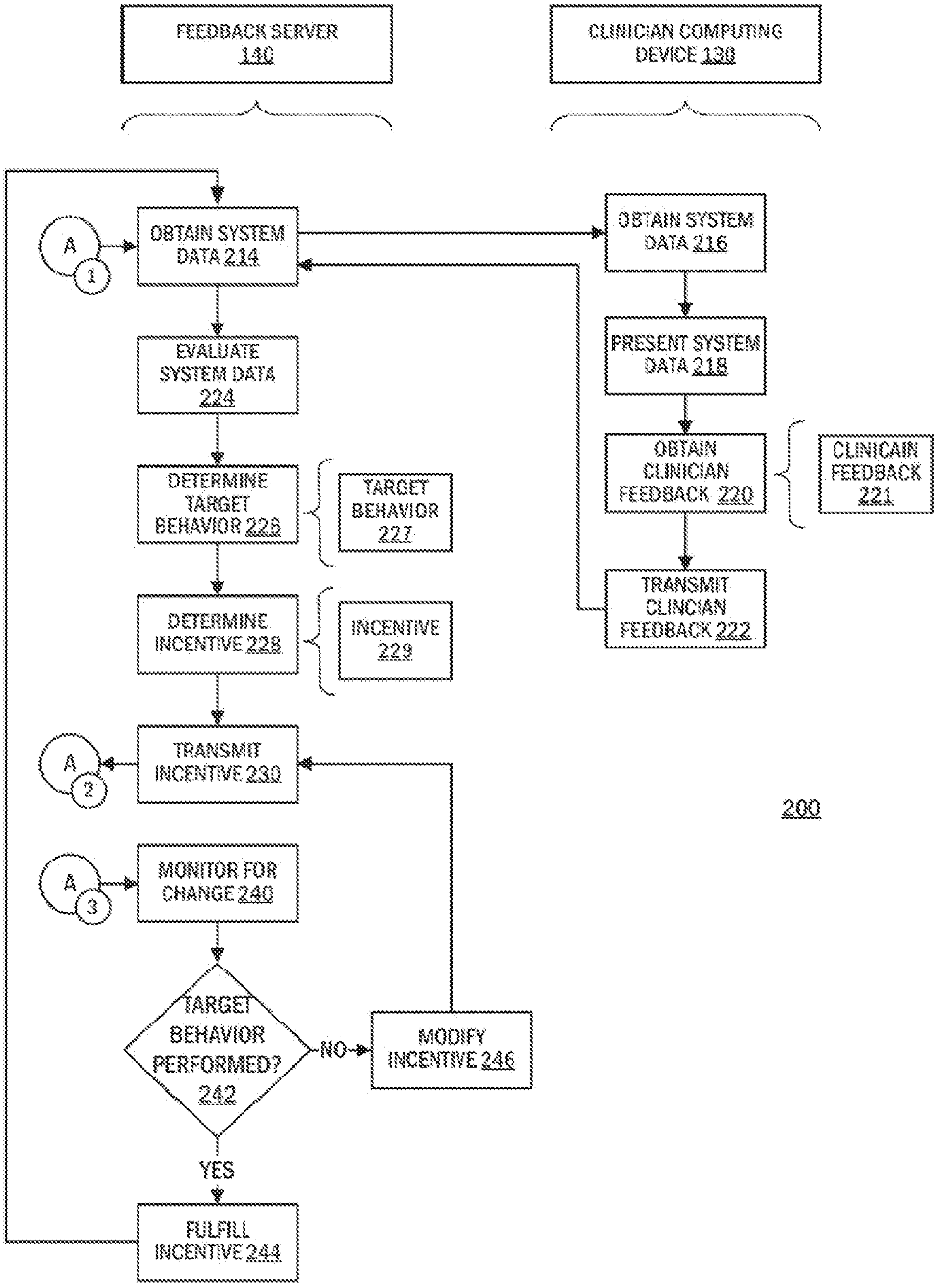

FIG. 2, which is made up of FIG. 2A and FIG. 2B, illustrates a method 200 for improving the performance the auditory prosthesis 110 by customizing the auditory prosthesis settings 114. As illustrated, the method 200 begins with operation 202.

In operation 202, the auditory prosthesis 110 operates with the auditory prosthesis settings 114. This operation 202 can take any of a variety of forms depending on the configuration of the auditory prosthesis 110. In many examples, the operation 202 includes the auditory prosthesis 110 receiving sound input from the environment 101 (e.g., using a microphone of the auditory prosthesis 110), converting the sound input into a stimulation signal, and using the stimulation signal to produce stimulation (e.g., vibratory or electrical) to cause a hearing percept in the recipient. The auditory prosthesis settings 114 are used to, for example, control how the sound input is converted to the stimulation signal. Following operation 202, the flow of the method 200 can move to operation 204.

In operation 204, the auditory prosthesis 110 obtains auditory prosthesis sensor data 205. Obtaining auditory prosthesis sensor data 205 includes the auditory prosthesis 110 obtaining data from the auditory prosthesis sensor set 112. The auditory prosthesis sensor data can include, for example, accelerometer data, gyroscopic sensor data, location data, biosensor data (e.g., heart rate data or blood pressure data), light sensor data, data regarding usage of the auditory prosthesis 110, or scene classifier data, among other data.

In examples, the auditory prosthesis 110 periodically obtains readings from the auditory prosthesis sensor set 112. In other examples, the auditory prosthesis 110 obtains the readings responsive to a request (e.g., a request received from the recipient computing device 120). In examples, the operation 204 includes obtaining time period data regarding when (e.g., time of day) and for how long particular auditory prosthesis settings 114 were used by the auditory prosthesis 110. In examples, the operation 204 includes environment time period data regarding when (e.g., time of day) and for how long the auditory prosthesis 110 operated in particular environments 101. Following operation 204, the flow of the method 200 can move to operation 206.

In operation 206, the auditory prosthesis 110 transmits the auditory prosthesis sensor data 205 to the recipient computing device 120. In an example, this operation 206 includes the auditory prosthesis 110 providing the auditory prosthesis sensor data 205 to the recipient computing device 120 over a wired or wireless data connection. In examples, the auditory prosthesis application 124 can be used to facilitate the operation 206.

Operation 204 and 206 can be performed at a variety of frequencies and the amount of auditory prosthesis sensor data 205 can likewise vary. For instance, in some examples, the obtaining and transmitting of the auditory prosthesis sensor data 205 occurs without substantial delay. In other examples, the auditory prosthesis 110 obtains and stores the auditory prosthesis sensor data 205 in batches and transmits the auditory prosthesis sensor data 205 less frequently. Following operation 206, the flow of the method 200 can move to operation 210. The method 200 can further include operation 208.

In operation 208, the recipient computing device 120 obtains recipient computing device sensor data 209. Obtaining recipient computing device sensor data 209 includes the recipient computing device 120 obtaining data from the recipient computing device sensor set 122. For instance, the recipient computing device sensor data 209 can include accelerometer data, gyroscopic sensor data, location data, biosensor data (e.g., heart rate data or blood pressure data), or light sensor data, among other data obtained from respective sensors of the recipient computing device sensor set 122. In an example, the recipient computing device sensor data 209 includes data regarding nearby wireless broadcasts, such as WI-FI SSIDs (Service Set Identifiers). Such wireless broadcasts can be useful for determining a current location as well as a current location type. For instance, while the auditory prosthesis 110 is operating in a coffee shop, the recipient computing device 120 may detect a WI-FI SSID called "Coffee Shop Wi-Fi". In examples, the recipient computing device 120 periodically obtains readings from the recipient computing device sensor set 122. In other examples, the recipient computing device 120 obtains the readings responsive to a request (e.g., a request received from the auditory prosthesis application 124). Following operation 208, the flow of the method 200 can move to operation 210.

In operation 210, the recipient computing device 120 collects system data 211. The system data 211 is data regarding components of the system 100 and in many examples includes the auditory prosthesis sensor data 205 and the recipient computing device sensor data 209. In examples, the system data 211 can further include additional data that may be relevant for customizing the auditory prosthesis settings 114. In some examples, collecting the system data 211 includes receiving the auditory prosthesis sensor data 205 from the auditory prosthesis 110. In some examples, collecting the system data 211 includes receiving the recipient computing device sensor data 209. In some examples, collecting the system data 211 can include collecting additional data, such as responses to inquiries, as described in process 300 in FIG. 3. Following operation 210, the flow of the method 200 can move to operation 212.

In operation 212, the recipient computing device 120 transmits the system data 211 to the feedback server 140. In some examples, the recipient computing device 120 periodically sends the system data 211 to the feedback server 140. In some examples, the recipient computing device 120 receives a data request from the feedback server 140 and sends the system data 211 in response thereto. Following operation 212, the flow of the method 200 can move to operation 214 (see FIG. 2B).

In operation 214, the feedback server 140 obtains the system data 211. In examples, obtaining the system data 211 includes receiving the system data 211 from the recipient computing device 120. In some examples, the system data 211 is pushed to the feedback server 140 from the recipient computing device 120. In other examples, the feedback server 140 sends a request to the recipient computing device 120 to obtain the system data 211. In some instances, the obtaining the system data 211 includes receiving clinician feedback from the clinician computing device 130 and adding the clinician feedback to the system data 211. For example, the feedback server 140 provides already-obtained system data 211 to the clinician computing device 130 for supplementation with clinician feedback. In such instances, the flow of the method 200 can move to operation 216.

In operation 216, the clinician computing device 130 obtains the system data 211. In some examples, the system data 211 is obtained from the feedback server 140. In other examples, the system data 211 is obtained directly from the recipient computing device 120. Following operation 216, the flow of the method 200 can move to operation 218.

In operation 218, the clinician computing device 130 presents the system data 211 to a clinician. Presenting the system data 211 can include presenting the system data 211 directly or presenting a summary report of the system data 211. In some examples, the clinician computing device 130 presents questions to the clinician regarding the system data 211.

In some examples, the clinician can use the system data 211 as evidence to demonstrate a benefit of the auditory prosthesis 110 to the recipient as part of a health care system requirement. Traditionally such proof was collected through standardized tests and measurements performed in a test booth environment of a clinic. The clinician computing device 130 can store the system data 211 as objective and subjective evidence of the benefits provided by the auditory prosthesis during daily use.

Following operation 218, the flow of the method 200 can move to operation 220.

In operation 220, the clinician computing device 130 obtains clinician feedback 221. The clinician feedback 221 is feedback from the clinician for regarding the system data 211. In some examples, the clinician feedback 221 includes a comment from the clinician to be provided to the recipient. In some examples, the clinician feedback 221 includes a response to a question from the clinician computing device 130 or the feedback server 140. In some examples, the clinician computing device 130 provides options for selection by the clinician. For instance, the feedback server 140 may determine that there are multiple possible settings or groups of settings to recommend to the recipient. The feedback server 140 then provides the multiple options to the clinician for selection via the clinician computing device 130. The clinician computing device 130 then receives a selection of one or more of the settings for recommending to the recipient. The selected option then becomes part of the system data 211. In other examples, the clinician computing device 130 asks questions regarding goals or desired outcomes for the recipient. Such questions can include, for example, "what sonic environments would you like to encourage the recipient to experience?" Such questions can be selected from a script of predefined questions. In examples, obtaining clinician feedback includes obtaining feedback from the clinician regarding the method 200 overall, such as how frequently the system data 211 should be obtained (e.g., real time, hourly, daily, etc.). Following operation 220, the flow of the method 200 can move to operation 222.

In operation 222, the clinician computing device 130 transmits the clinician feedback 221 to the feedback server 140. Following operation 222, the flow of the method 200 can move to operation 214, which includes obtaining the recipient data. Following operation 214, the flow of the method 200 can move to operation 224.

In operation 224, the feedback server 140 evaluates the system data 211. In examples, evaluating the system data 211 can include determining using the system data 211 whether a customization to the auditory prosthesis 110 would improve the functioning of the auditory prosthesis 110. For example, the evaluation can include analysis of the system data 211, which includes data from multiple different sensors. The data from the multiple different sensors can be used to identify, for example, certain operation patterns that may indicate sub-optimal auditory prosthesis settings 114. For instance, the system data 211 may indicate that the auditory prosthesis 110 is often deactivated (e.g., the recipient turns off the auditory prosthesis 110) when the auditory prosthesis 110 is operated in particular environments 101, such as at a particular location (e.g., as determined by location data from a location sensor or from a location field in a calendar entry) or during a particular activity (e.g., during exercise as determined based on heart rate data). Such operation patterns can indicate a sub-optimal auditory prosthesis settings 114 that the system 100 can attempt to correct.

In an example, the evaluating includes determining a hearing effort score based on the system data 211. In an example, determining hearing effort includes determining whether the recipient had difficulty hearing during a relevant time period over which the system data 211 was collected. For instance, difficulty hearing can be determined based on a number of factors, such as recipient feedback (e.g., recipient feedback indicating that the recipient had difficulty hearing), frequent changes to settings, decrease in certain activities (e.g., the auditory prosthesis is operated in conversation environments less frequently than before), and movement data, among other data.

In an example, the evaluating includes determining whether the auditory prosthesis 110 operated with a particular map for a particular length of time. For instance, the particular map is an auditory prosthesis setting 114 and the map may be used for less than a target amount of time.

In an example, the evaluating includes determining whether the auditory prosthesis 110 operates with beneficial settings in particular environments 101 by comparing usage data with settings data. For instance, the auditory prosthesis 110 may frequently operate in musical sonic environments but may not be using settings optimized for such environments. For instance, this may be determined by comparing data from the scene classifier of the auditory prosthesis sensor set 112 (e.g., to determine a sound environment) with data regarding which auditory prosthesis settings 114 were used during those times.

In an example, the evaluating includes determining whether usage patterns satisfy (e.g., pass) a threshold. For instance, whether the auditory prosthesis 110 was inactive (e.g., powered off or in a sleep mode) more than a threshold amount. In an example, the threshold is set by the clinician using the clinician feedback 221 or as a default threshold set by the manufacturer of the auditory prosthesis.

In an example, the evaluating includes analyzing usage patterns over time to determine, for example, whether the patterns include outliers or particular trends (e.g., favorable or unfavorable data trends). Such analysis of usage patterns can be performed using statistical analysis of the usage patterns.

In an example, the evaluating includes determining whether the system data 211 is an outlier from artificial system data. For instance, the clinician or manufacturer can define artificial system data that is representative of nominal or ideal auditory prosthesis usage data.

In an example, the evaluating includes determining whether the system data 211 is an outlier from a cohort of auditory prostheses similar to the auditory prosthesis 110. In an example, the cohort of auditory prostheses are labeled by their respective clinicians as having an exemplary usage pattern. In another example the cohort is a group of people having typical hearing. In another example, the cohort is a cohort of auditory prostheses worn by recipients of similar demographic backgrounds as the recipient.

In an example, the evaluating includes determining whether the system data 211 is an outlier from baseline operation data. The baseline operation data can be prior system data 211 for the recipient, average data from the cohort, a baseline set by the clinician, or a baseline set by the manufacturer of the auditory prosthesis, among other baselines.

In examples, the evaluating includes comparing the system data 211 to a plan for the recipient. In an example, the clinician provides a plan for the recipient to follow. The plan can describe desirable usage patterns for the auditory prosthesis.

Following operation 224, the flow of the method 200 can move to operation 226.

In operation 226, the feedback server 140 determines a target behavior 227. In examples, the target behavior is determined based on the evaluation of the system data 211. For example, where the evaluation determines that the auditory prosthesis 110 is operating using a particular setting less than a threshold amount, the feedback server 140 can determine that the target behavior 227 is for the auditory prosthesis 110 to operate using the setting more than the threshold amount (or at least more than during a previous time period). In examples, the target behavior 227 is determined using the clinician feedback 221. For example, the clinician feedback 221 can include a description of a desired behavior, such as the auditory prosthesis 110 operating in a particular setting more. In examples, the target behavior 227 is selected in a random or pseudorandom manner from available options. In examples, the target behavior 227 is selected as a next target desired behavior in a progression of behaviors as part of a training pattern.

In examples, determining the target behavior 227 includes determining in which environments 101 the auditory prosthesis 110 operates with sub-optimal auditory prosthesis settings 114 and defining the target behavior 227 to be operating the auditory prosthesis 110 with more-optimal auditory prosthesis settings 114. For instance, where the auditory prosthesis 110 operates with settings for a music environment while operating in a conversation environment, the target behavior 227 can be set to operating with settings for a conversation environment while in a conversation environment.

In examples, determining the target behavior 227 includes defining a target behavior 227 that includes the auditory prosthesis 110 operating in a manner that satisfies a threshold responsive to the evaluation in operation 224 determining that the usage patterns of the auditory prosthesis 110 do not satisfy a threshold. For instance, where the auditory prosthesis 110 was inactive more than a threshold amount, the target behavior 227 can be defined as operating the auditory prosthesis 110 such that it is not inactive more than the threshold amount. In other examples the target behavior 227 can be defined as satisfying a modified threshold (e.g., a threshold that is easier to achieve than the previous threshold), such as a threshold that is between the current threshold and the actual behavior of the auditory prosthesis 110 as determined by the system data 211 (e.g., the modified threshold is set to fifteen events when the prior threshold was ten events and the actual usage is twenty events).

In an example, determining the target behavior 227 includes defining a target behavior 227 that includes operating the auditory prosthesis 110 in a particular environment 101. For instance, the environment 101 may be a particular acoustic environment 101, such as a concert, a noisy coffee shop, or in a vehicle. In some examples, the target behavior 227 is a desirable lifestyle behavior for the recipient, such as exercise.

In examples, determining the target behavior 227 includes defining a target behavior 227 that would reduce outlier operation or modify operational trends. In this manner, the target behavior 227 can be determined based on statistical analysis performed in operation 224 and selecting parameters of the target behavior 227 that would reduce the outlier operation or modify the trends in a beneficial manner.

Following operation 226, the flow of the method 200 can move to operation 228.

In operation 228, the feedback server 140 determines an incentive 229. The incentive 229 is a motivator provided to the recipient to cause the recipient to take a particular course of action based on the target behavior 227, such as operating the auditory prosthesis 110 with a particular auditory prosthesis setting 114 defined by the target behavior 227 or operating the auditory prosthesis 110 in a particular environment 101 defined by the target behavior 227. Determining an incentive 229 can include determining an incentive 229 that would increase the likelihood of the auditory prosthesis 110 being set by the recipient to operate with a particular setting or in a particular environment 101. In examples, the incentive 229 is determined based on a prior incentive 229, such as a prior incentive 229 that caused desired behavior to occur (e.g., the same incentive 229 can be used) or a prior incentive 229 that did not cause desired behavior to occur (e.g., then a different incentive 229 can be used).

Examples of incentives 229 can include additional functionality of the auditory prosthesis 110, such as additional recipient-selectable auditory prosthesis settings 114. For instance certain auditory prosthesis settings 114 may be unavailable to the recipient, but can be unlocked as part of the incentives. In some examples, the incentives 229 include modifications to a user interface of the recipient computing device 120 (e.g., the auditory prosthesis application thereof) to improve the ability of the recipient computing device 120 to interact with the recipient. For instance, some recipients prefer alternative user interface themes, such as themes have modified colors or fonts. The incentive 229 can be an indication that the user interface will be modified responsive to determining that the auditory prosthesis 110 is operated with particular settings or in particular environments. As a specific example, the incentive 229 can be the unlocking of a dark mode theme in response to the auditory prosthesis 110 being operated with conversation settings more than twelve separate times over the course of week.

Additional examples of incentives 229 include providing reward points to a recipient. The reward points can be tracked by the feedback server 140. Upon reaching a certain number of reward points, the recipient can unlock rewards, such as like spare parts for the auditory prosthesis 110 (e.g., cables or batteries), customizations for the auditory prosthesis (e.g., a customized face plate for the auditory prosthesis 110), access to web content, invitations to events, unlock new content for the auditory prosthesis application 124 (e.g., new themes or modes). In examples, when the reward points pass a threshold amount without being redeemed, the auditory prosthesis application 124 can notify the recipient.

In an example, determining the incentive 229 includes selecting a default incentive (e.g., a default number of reward points). For instance, the incentives 229 may be predefined by the manufacturer of the auditory prosthesis 110. Such incentives 229 can be predefined for all target behaviors 227 (e.g., all target behaviors 227 that have the same incentive 229), predefined for certain classes of target behaviors (e.g., all target behaviors 227 for operating in a particular environment 101 have a first incentive and all target behaviors 227 for using particular settings have a second incentive), or predefined for each different target behaviors 227. In some examples, the incentives 229 are selected based on modifying a default incentive 229 based on a distance away from the target behavior 227 the recipient is. For instance, the further away the target behavior 227 is from the current behavior, the greater the default incentive 229 is scaled up.

Following operation 228, the flow of the method 200 can move to operation 230.

In operation 230, the feedback server 140 transmits the incentive 229 to the recipient computing device 120. In an example, transmitting the incentive 229 includes sending a message including the incentive 229 (or a description of the incentive 229) from the feedback server 140 to the recipient computing device 120 over the network 102. Following operation 230, the flow of the method 200 can move to operation 232 (see FIG. 2A).

In operation 232, the recipient computing device 120 receives the incentive 229 from the feedback server 140. In an example, receiving the incentive 229 includes the recipient computing device 120 receiving a message from the feedback server 140 sent over the network 102 that includes the incentive 229. Following operation 232, the flow of the method 200 can move to operation 234.

In operation 234, the recipient computing device 120 presents the incentive 229 to the recipient. In examples, presenting the incentive 229 includes providing a notification including a description of the incentive 229 on a display of the recipient computing device 120. In examples, the notification is provided responsive to the recipient computing device 120 receiving the incentive from the feedback server 140. In other examples, the recipient computing device 120 holds the notification until the occurrence of a particular event. For instance, the incentive 229 may describe a number of reward points to be awarded if the auditory prosthesis 110 is operated using a wind-resistant setting while the auditory prosthesis 110 is operated in an exercising-outdoors environment 101. Upon the recipient computing device 120 determining that the environment 101 is currently or is about to be an exercising-outdoors environment 101 (e.g., using the recipient computing device sensor set 122), the recipient computing device 120 provide the incentive 229 in a notification. In this manner, the recipient is incentivized with the incentive 229 to cause the target behavior 225 to occur at an appropriate time. By providing the notification at an appropriate time, the system 100 provides an improved interaction with the recipient.

By presenting the incentive 229 to the recipient, the user interface of the recipient computing device 120 becomes more engaging to the recipient and increases the likelihood that the recipient will operate the auditory prosthesis 110 with the improved settings. So presenting the incentive 229 tied to the target behavior 227 to the recipient improves the customization of the auditory prosthesis 110 for the recipient. And by incentivizing the recipient to operate the auditory prosthesis according to the target behavior 227, the functionality of the auditory prosthesis 110 is improved.

Responsive to presenting the incentive 229, the recipient computing device 120 can send a notification to the feedback server 140. The notification notifies the feedback server 140 that the incentive 229 was provided. The flow of the method 200 moves to operation 236 and operation 240.

In operation 236, the auditory prosthesis 110 receives modified settings. For instance, the recipient is incentivized by the incentive 229 to use settings described by the target behavior 227 and changes the settings of the auditory prosthesis 110.

In an example, the auditory prosthesis 110 receives modifications to the auditory prosthesis settings 114 from the auditory prosthesis application 124. For instance, the auditory prosthesis application 124 receives a change to the auditory prosthesis settings 114 from the recipient (e.g., via a user interface of the recipient computing device 120) and the auditory prosthesis application 124 pushes the modification to the auditory prosthesis 110.

In another example, the auditory prosthesis 110 receives the modified settings directly from the recipient over a user interface of the auditory prosthesis 110 (e.g., a button thereof). For instance, the recipient may be incentivized by the incentive 229 to modify the setting. Following operation 236, the flow of the method 200 can move to operation 238.

In operation 238, the auditory prosthesis 110 modifies the auditory prosthesis settings 114. In an example, the auditory prosthesis 110 modifies the auditory prosthesis settings 114 according to the modifications received in operation 236. The modifications change the operation of the auditory prosthesis 110 so that it performs differently than it did before (e.g., processes sound differently or provides stimulation differently). The auditory prosthesis 110 then operates according to those modified settings as the flow moves back to operation 202.

In some examples, the incentive 229 and the target behavior 227 are not related to the modification of the auditory prosthesis settings 114. For instance, the incentive 229 and the target behavior 227 may be related to operating the auditory prosthesis 110 in a particular sonic environment 101 instead.

In some examples, following presenting the incentive 229 in operation 234, the flow of the method 200 moves to operation 240 (see FIG. 2B).

In operation 240, the feedback server 140 monitors for a change based on the incentive 229. For instance, the change may be a modification in the operation of the auditory prosthesis 110 based on the incentive 229. In examples, the monitoring for the change is responsive to the feedback server 140 receiving the notification from the recipient computing device 120 that the incentive was presented in operation 234. In many examples, the feedback server 140 monitors for the change as part of (or using techniques similar to) operation 214 and operation 224. For example, during the course of obtaining the system data 211 and evaluating system behavior, the feedback server 140 determines whether the target behavior 227 was performed. Following operation 240, the flow of the method 200 can move to operation 242.

In operation 242, the feedback server 140 determines whether the target behavior 227 incentivized by the incentive 229 occurred. In examples, determining whether the target behavior 227 is performed includes determining that a change in the operation of the auditory prosthesis 110 occurred that satisfies the target behavior 227. For instance, where the target behavior 227 required the operation of the auditory prosthesis 110 with particular settings, and the auditory prosthesis 110 was operated with those settings, then the target behavior 227 was performed. Or where the target behavior 227 required the operation of the auditory prosthesis 110 in a particular environment 101, and the auditory prosthesis 110 was operated in that particular environment 101, then the target behavior 227 was performed.

Determining whether the target behavior 227 occurred can include one or more of the evaluation processes described above in relation to evaluating the system data 211 in operation 224.

If the target behavior 227 occurred, then the flow of the method 200 moves to operation 244. If the target behavior 227 did not occur, the flow of method 200 moves to operation 246. For instance, after a threshold amount of time or a threshold number of opportunities is reached without the target activity being performed, then the flow moves to operation 246.

In operation 244, the feedback server 140 fulfills the incentive 229. Continuing the previous example, a result of the incentive 229 may be the unlocking of a dark theme for the auditory prosthesis application 124 that would improve the ability of the recipient to interact with the auditory prosthesis application 124. So fulfilling the incentive 229 would involve unlocking the dark theme (e.g., by the feedback server 140 setting a flag in the auditory prosthesis application 124 indicating that the mode is available). Other examples of fulfilling the incentive 229 can include providing the recipient with reward points.

In examples, fulfilling the incentive 229 includes the feedback server 140 sending a notification to the recipient computing device 120 regarding the incentive 229. For instance the indication can be that the incentive 229 has been fulfilled (e.g., that the recipient is awarded a number of points). The fulfilling of the incentive 229 can further includes sending a second notification to the clinician computing device 130 to notify the clinician that the incentive 229 was fulfilled.

In operation 246, the feedback server 140 modifies the incentive 229. In an example, the incentive 229 is modified such that a reward for the incentive 229 being completed is increased, the requirements for completion are decreased, or the reward is changed to a different reward type. In this example, the modification of the incentive 229 can encourage the target behavior 227 to be performed. Following modification, the flow returns to operation 230 in which the modified incentive 229 is transmitted.

The method 200 can be repeated. As the system data 211 is collected and evaluated and as incentives are provided, the operation of the auditory prosthesis 110 can change to beneficially customize the auditory prosthesis 110 to the recipient. For instance, a first system data 211 is collected and evaluated. An incentive 229 is determined and provided based thereon to incentivize particular operation of the auditory prosthesis 110 (e.g., in a particular environment 101 or with particular auditory prosthesis settings 114). Then second system data 211 is collected and evaluated to determine whether the incentive 229 should be fulfilled.

Figure 3:
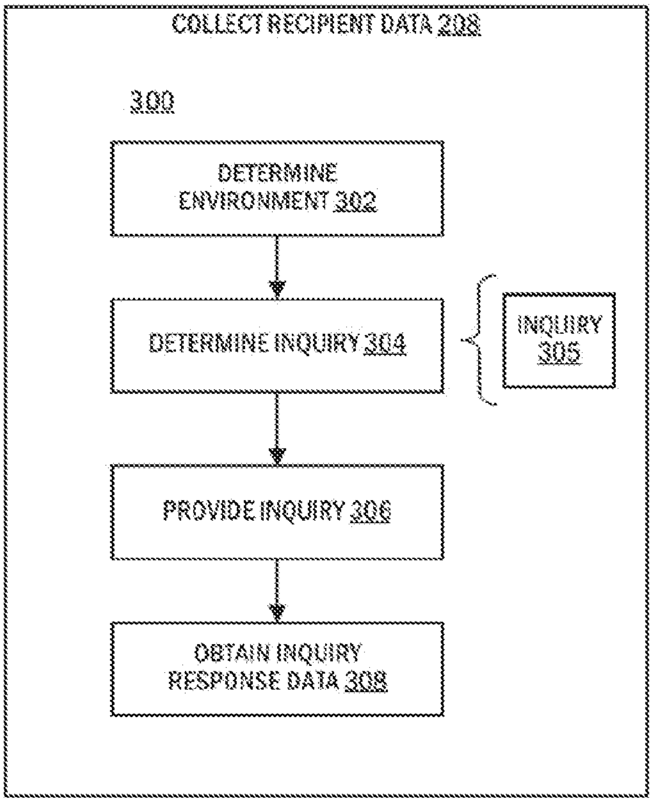
FIG. 3 illustrates a process for collecting recipient data.

FIG. 3 illustrates a process 300 for collecting recipient data, such as may be performed in operation 208. For instance, the recipient data can be feedback collected from the recipient. The feedback can be data representative of the recipient's experience with the auditory prosthesis settings 114 and the environment 101 in which the auditory prosthesis 110 was operated. Thus the feedback can be used to customize the auditory prosthesis 110 to the recipient such that the auditory prosthesis 110 can be customized to function better. The feedback can be obtained in a variety of ways, including through free response questions or multiple choice questions. In some examples, the auditory prosthesis application 124 prompts the recipient to select from emoticons representative of an answer to the questions. Such emoticons can be, for example, an emoticon with a happy expression, an emoticon with a neutral expression, and an emoticon with a sad expression. In an example, the process 300 begins with operation 302.

In operation 302, the environment 101 is determined. In examples, determining the environment 101 is based on the system data 211. For instance, the system data 211 can be compared against templates of particular environments. The templates can describe qualities of environments and if the qualities are met, then it is determined that the particular environment 101 is present. For instance a template for an outdoor running environment can be based on elevated heart rate, particular movement patterns (e.g., based on an accelerometer), and a location outside of a building (e.g., based on location data). As another example, a template for a conversation at a coffee shop can be based on scene classifier data of the auditory prosthesis 110 indicating a conversation and a location being at a coffee shop. In many examples, the environment 101 an environment that the auditory prosthesis 110 is currently operating in, but can be an environment 101 in which the auditory prosthesis 110 will soon operate or an environment 101 in which the auditory prosthesis 110 recently operated.

In operation 304, an inquiry 305 is determined. Determining the inquiry can include selecting an inquiry 305 based on the environment 101 determined in operation 202. Determining the inquiry 305 can include selecting an inquiry 305 based on the system data 211. In this manner the various aspects of the system data 211 can be used to determine when the recipient is to be prompted to do an evaluation of his or her hearing or the performance of the auditory prosthesis 110. For instance, the feedback server 140 stores one or more inquiries 305 that are labeled for use with particular environment types that can be filled in with data regarding the environment 101. Examples of inquiries 305 are provided in the below TABLE.

TABLE

| Inquiry Type | Example Inquiry |
|---|---|
| Location-based | "You're at <LOCATION_NAME>, rate your experience now" |
| Sound environment, time, and duration question | "You're in <SOUND_ENVIRONMENT>, is it better than <PREVIOUS_TIME>" |
| Provide encouragement based on progress | "Great progress! You logged <TIME> of <TYPE>" |
| Activity-based questions | "You just finished <ACTIVITY>, how was the wind noise?" |
| Timely questions | "You just switched off your processor, how would you rate your day?" |
| Task-list motivation | "You've completed <COMPLETED NUMBER> of <REMAINING NUMBER> tasks. Only <NUMBER> more to go!" |
| In the moment questions | "It's the end of the day, time for a few detailed questions" |

In some examples, the inquiry 305 is based on a previous target behavior 227 or incentive 229. For instance, "You have been trying <SETTING> for the past day, how would you rate your auditory prosthesis's performance with it?" In examples, the inquiry 305 is received as part of the clinician feedback 221. In some examples, the received inquiry has a condition associated with it, such as: when the recipient finishes exercising, ask the recipient how the auditory prosthesis 110 performed.

In some examples, determining the inquiry 305 is based on the occurrence of an auditory event having characteristics above a threshold. For instance, the auditory event can be a critical or extreme situation or a situation where the clinician wishes to examine performance of the auditory prosthesis 110. The occurrence can be determined based on the system data 211. For instance, the occurrence can include operating the auditory prosthesis 110 in a particular environment 101, operating the auditory prosthesis 110 with particular auditory prosthesis settings 114, the auditory prosthesis 110 processing sound having a particular characteristic (e.g., a loudness above a certain decibel threshold), and the auditory prosthesis 110 performing in an abnormal way, among other occurrences. The system data 211 regarding the occurrence can be stored and the inquiry 305 can be determined based on the occurrence, such as asking the recipient how the auditory prosthesis 110 preformed. In some examples, the system data 211 is stored, processed, or obtained (e.g., in operations 214 or 224) when a particular occurrence (e.g., an outlier event) is detected. This can save processor cycles and storage space by focusing the method 200 on outlier events.

In operation 306, the inquiry 305 is provided. In examples, providing the inquiry 305 involves providing the inquiry 305 over a user interface of the recipient computing device 120. In examples, the inquiry 305 is provided on a display of the recipient computing device 120.

In operation 308, inquiry response data is obtained. The inquiry response data is data received in response to the inquiry 305. For instance the inquiry response data includes an answer to a question contained in the inquiry 305. The inquiry response data can be stored, such as part of the system data 211. In examples, obtaining the response includes receiving a response from the recipient over the user interface of the recipient computing device 120.

The response to the inquiry 305 as part of this method 300 can be used as part of the system data 211 to evaluate performance of the auditory prosthesis 110 and determine the target behavior 227. For instance, where the response indicates that a recipient is having difficulty in a particular environment 101, the target behavior 227 and the incentive 229 can relate to the recipient trying a different auditory prosthesis setting 114 for the environment 101.

The methods described above can provide various benefits. In examples, the collection of system data 211 can provide useful benefits in not only customizing the auditory prosthesis 110, but also in determining how well the auditory prosthesis 110 is functioning and monitoring its benefit to the recipient. The amount and quality of the data received as part of the system data 211 can be steered through the type and value of the incentive 229 provided. Further, while the methods may be part of a defined, in-clinic fitting process, the methods may support customization of the auditory prosthesis outside of the in-clinic fitting process and offer real time feedback and customization. This reduces a lag time between a need for customization and the auditory prosthesis being customized. Further, combining various objective measures (e.g., sensor data from multiple different sensors from multiple different devices) in real time, together with subjective input from the recipient (e.g. preference to the sound input provided by the auditory prosthesis, self-rating of performance and satisfaction provided as part of the method 300) in real time increases the number of data points of the system data 211. Further the relevance and quality of the data is improved because it is taken in the moment rather than relying on the recipient's recollection up to months after the actual experience. The system data 211 can be used by an automatic reprogramming/adjustment system for the auditory prosthesis 110 as well as to prove auditory prosthesis 110 performance. Thus the use of the system data 211 provides advantages over the subjective and "one-off" input from a traditional fitting session in a clinic. By utilizing the system data 211, the auditory prosthesis 110 can be fully or partially self-customizing, thereby providing superior hearing outcomes and an improved hearing experience for the recipient. The auditory prosthesis 110 functioning as part of the overall system 100 can sense, adjust, test, and reprogram according to the system data 211 to constantly adapt to the environments 101 in which the auditory prosthesis 101 operates. In some examples, the traditional practice of fitting the auditory prosthesis 110 in a clinic would be made redundant or could provide more high level support. In this manner systems and methods described herein can save time for the recipient and clinic, and improve the overall hearing outcome for the recipient. Further, the systems and methods herein can increase the sensitivity of the system data 211, remove the risk of the recipient being influenced by the clinical environment, and that the performance rating at a limited measurement time influences the validity of the data.

Auditory Prostheses

As previously described, the auditory prosthesis 110 can take any of a variety of forms. Examples of these forms are described in more detail in FIGS. 4-6, below. For instance, the auditory prosthesis 110 may be the cochlear implant system 410 of FIG. 4, the percutaneous bone conduction device 500 of FIG. 5, or the transcutaneous bone conduction device 600 of FIG. 6. These different auditory prostheses 110 can benefit from use with the systems and processes described above. For instance, the method 200 can be used to customize the auditory prosthesis 110 to function better.

Figure 4:
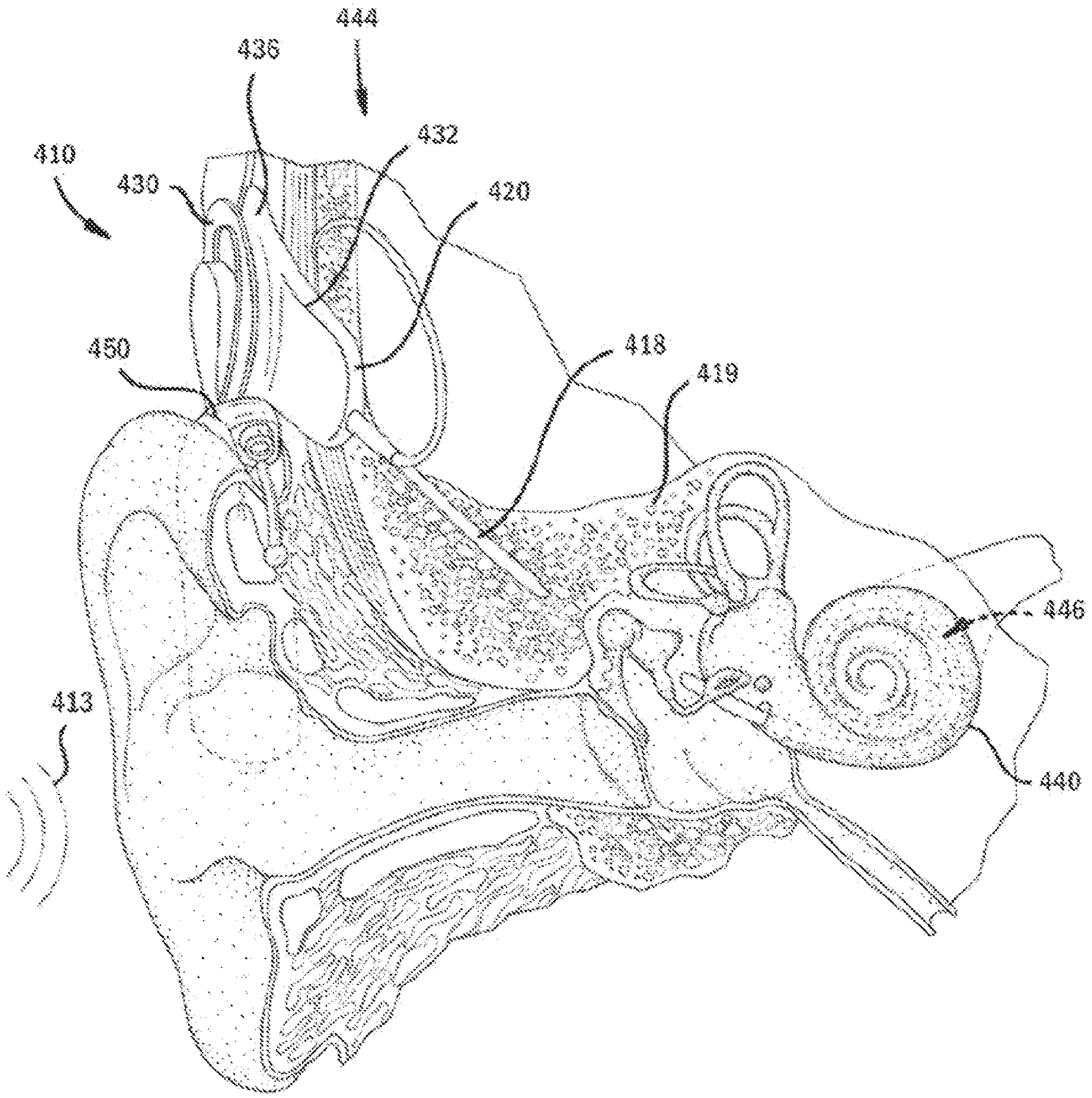
FIG. 4 illustrates an example cochlear implant system that can benefit from the use of technologies described herein.

FIG. 4 illustrates an example cochlear implant system 410 that can benefit from use of the technologies disclosed herein. The cochlear implant system 410 includes an implantable component 444 typically having an internal receiver/transceiver unit 432, a stimulator unit 420, and an elongate lead 418. The internal receiver/transceiver unit 432 permits the cochlear implant system 410 to receive signals from and/or transmit signals to an external device 450. The external device 450 can be a button sound processor worn on the head that includes a receiver/transceiver coil 430 and sound processing components. Alternatively, the external device 450 can be just a transmitter/transceiver coil in communication with a behind-the-ear device that includes the sound processing components and microphone.

The implantable component 444 includes an internal coil 436, and preferably, a magnet (not shown) fixed relative to the internal coil 436. The magnet can be embedded in a pliable silicone or other biocompatible encapsulant, along with the internal coil 436. Signals sent generally correspond to external sound 413. The internal receiver/transceiver unit 432 and the stimulator unit 420 are hermetically sealed within a biocompatible housing, sometimes collectively referred to as a stimulator/receiver unit. Included magnets (not shown) can facilitate the operational alignment of an external coil 430 and the internal coil 436, enabling the internal coil 436 to receive power and stimulation data from the external coil 430. The external coil 430 is contained within an external portion. The elongate lead 418 has a proximal end connected to the stimulator unit 420, and a distal end 446 implanted in a cochlea 440 of the recipient. The elongate lead 418 extends from stimulator unit 420 to the cochlea 440 through a mastoid bone 419 of the recipient. The elongate lead 418 is used to provide electrical stimulation to the cochlea 440 based on the stimulation data. The stimulation data can be created based on the external sound 413 using the sound processing components and based on the auditory prosthesis settings 114.

In certain examples, the external coil 430 transmits electrical signals (e.g., power and stimulation data) to the internal coil 436 via a radio frequency (RF) link. The internal coil 436 is typically a wire antenna coil having multiple turns of electrically insulated single-strand or multi-strand platinum or gold wire. The electrical insulation of the internal coil 436 can be provided by a flexible silicone molding. Various types of energy transfer, such as infrared (IR), electromagnetic, capacitive and inductive transfer, can be used to transfer the power and/or data from external device to cochlear implant. While the above description has described internal and external coils being formed from insulated wire, in many cases, the internal and/or external coils can be implemented via electrically conductive traces.

Figure 5:
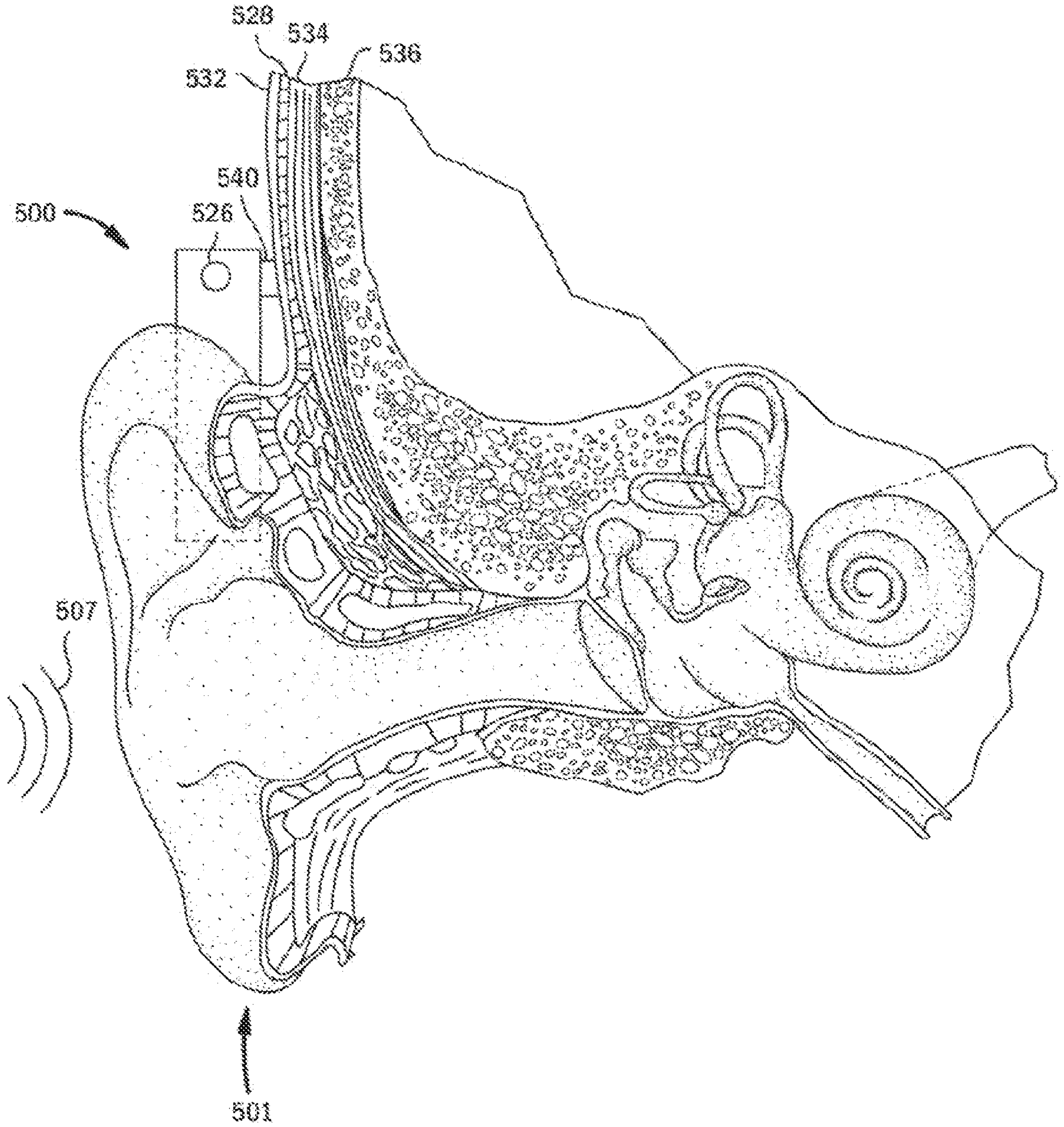
FIG. 5 is a view of an example percutaneous bone conduction device that can benefit from use of the technologies disclosed herein.

FIG. 5 is a view of an example of a percutaneous bone conduction device 500 that can benefit from use of the technologies disclosed herein. For example, the auditory prosthesis settings 114 of the device 500 can be customized using one or more aspects of disclosed technology. The bone conduction device 500 is positioned behind an outer ear 501 of a recipient of the device. The bone conduction device 500 includes a sound input element 526 to receive sound signals 507. The sound input element 526 can be a microphone, telecoil or similar. In the present example, the sound input element 526 may be located, for example, on or in the bone conduction device 500, or on a cable extending from the bone conduction device 500. Also, the bone conduction device 500 comprises a sound processor (not shown), a vibrating electromagnetic actuator and/or various other operational components.

More particularly, the sound input element 526 converts received sound signals into electrical signals. These electrical signals are processed by the sound processor. The sound processor generates control signals that cause the actuator to vibrate. In other words, the actuator converts the electrical signals into mechanical force to impart vibrations to a skull bone 536 of the recipient. The conversion of the electrical signals into mechanical force can be based on the auditory prosthesis settings 114, such that different auditory prosthesis settings 114 may result in different mechanical force being generated from a same sound signal 507.

The bone conduction device 500 further includes a coupling apparatus 540 to attach the bone conduction device 500 to the recipient. In the illustrated example, the coupling apparatus 540 is attached to an anchor system (not shown) implanted in the recipient. An exemplary anchor system (also referred to as a fixation system) may include a percutaneous abutment fixed to the skull bone 536. The abutment extends from the skull bone 536 through muscle 534, fat 528 and skin 532 so that the coupling apparatus 540 may be attached thereto. Such a percutaneous abutment provides an attachment location for the coupling apparatus 540 that facilitates efficient transmission of mechanical force.

Figure 6:
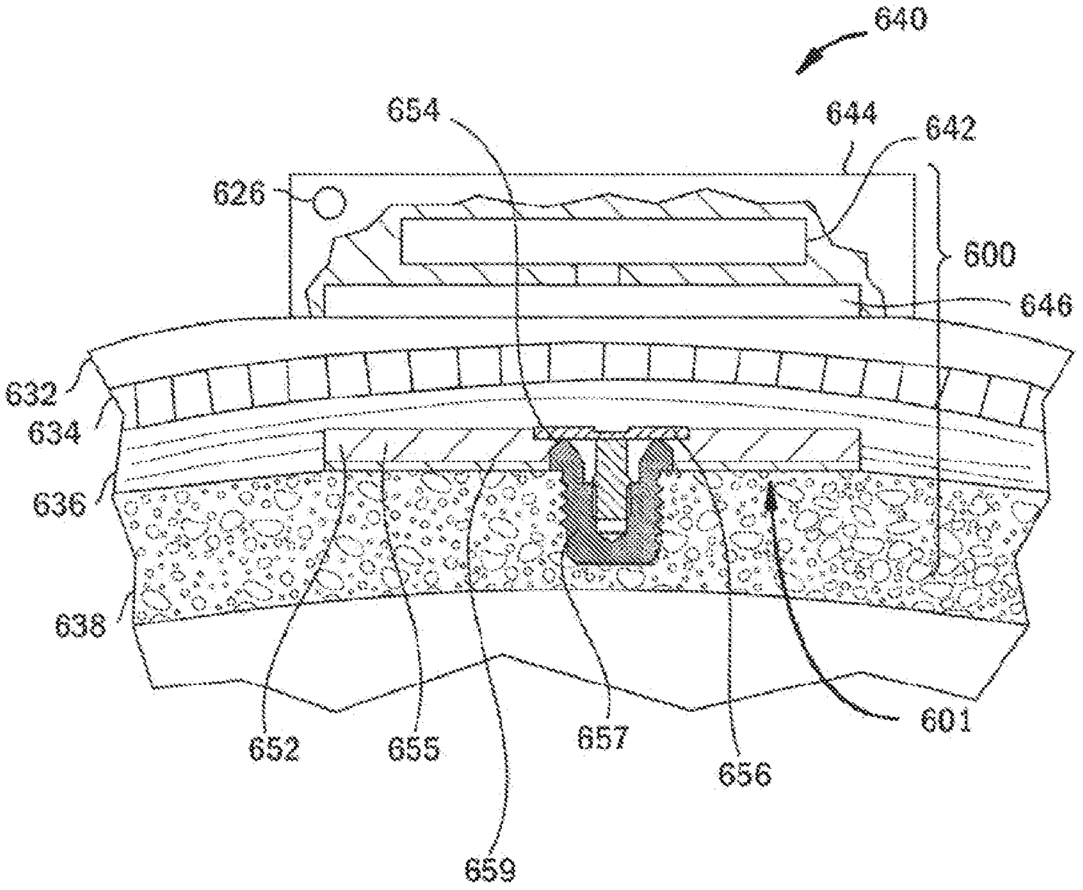
FIG. 6 illustrates an example transcutaneous bone conduction device having a passive implantable component that can benefit from use of the technologies disclosed herein.

FIG. 6 illustrates an example of a transcutaneous bone conduction device 600 having a passive implantable component 601 that can benefit from use of the technologies disclosed herein. The transcutaneous bone conduction device includes an external device 640 and an implantable component 601. The implantable component 601 includes a passive plate 655 mounted on the bone 638 and is transcutaneously coupled with a vibrating actuator 642 located in a housing 644 of the external device 640. The plate 655 may be in the form of a permanent magnet or in another form that generates or is reactive to a magnetic field, or otherwise permits the establishment of magnetic attraction between the external device 640 and the implantable component 650 sufficient to hold the external device 640 against the skin 632 of the recipient.

In an example, the vibrating actuator 642 is a component that converts electrical signals into vibration. In operation, sound input element 626 converts sound into electrical signals. Specifically, the transcutaneous bone conduction device 600 provides these electrical signals to a vibrating actuator 642, or to a sound processor (not shown) that processes the electrical signals, and then provides those processed signals to a vibrating actuator 642. The manner in which the sound processor processes the electrical signals can be modified based on the auditory prosthesis settings 114. The vibrating actuator 642 converts the electrical signals (processed or unprocessed) into vibrations. Because the vibrating actuator 642 is mechanically coupled to a plate 646, the vibrations are transferred from the vibrating actuator 642 to the plate 646. An implanted plate assembly 652 is part of the implantable component 650, and is made of a ferromagnetic material that may be in the form of a permanent magnet, that generates and/or is reactive to a magnetic field, or otherwise permits the establishment of a magnetic attraction between the external device 640 and the implantable component 650 sufficient to hold the external device 640 against the skin 632 of the recipient. Accordingly, vibrations produced by the vibrating actuator 642 of the external device 640 are transferred from plate 646 across the skin 632, fat 634, and muscle 636 to the plate 655 of the plate assembly 652. This may be accomplished as a result of mechanical conduction of the vibrations through the tissue, resulting from the external device 640 being in direct contact with the skin 632 and/or from the magnetic field between the two plates 646, 655. These vibrations are transferred without penetrating the skin 632 with a solid object such as an abutment.

As may be seen, the implanted plate assembly 652 is substantially rigidly attached to a bone fixture 657 in this example. But other bone fixtures may be used instead in this and other examples. In this regard, the implantable plate assembly 652 includes a through hole 654 that is contoured to the outer contours of the bone fixture 657. The through hole 654 thus forms a bone fixture interface section that is contoured to the exposed section of the bone fixture 657. In an example, the sections are sized and dimensioned such that at least a slip fit or an interference fit exists with respect to the sections. A plate screw 656 is used to secure plate assembly 652 to the bone fixture 657. The head of the plate screw 656 can be larger than the hole through the implantable plate assembly 652, and thus the plate screw 656 positively retains the implantable plate assembly 652 to the bone fixture 657. The portions of plate screw 656 that interface with the bone fixture 657 substantially correspond to an abutment screw detailed in greater detail below, thus permitting the plate screw 656 to readily fit into an existing bone fixture used in a percutaneous bone conduction device. In an example, the plate screw 656 is configured so that the same tools and procedures that are used to install and/or remove an abutment screw from the bone fixture 657 can be used to install and/or remove the plate screw 656 from the bone fixture 657. In some examples, there may be a silicone layer 659 disposed between the plate 655 and bone 136.

Computing System

Figure 7:
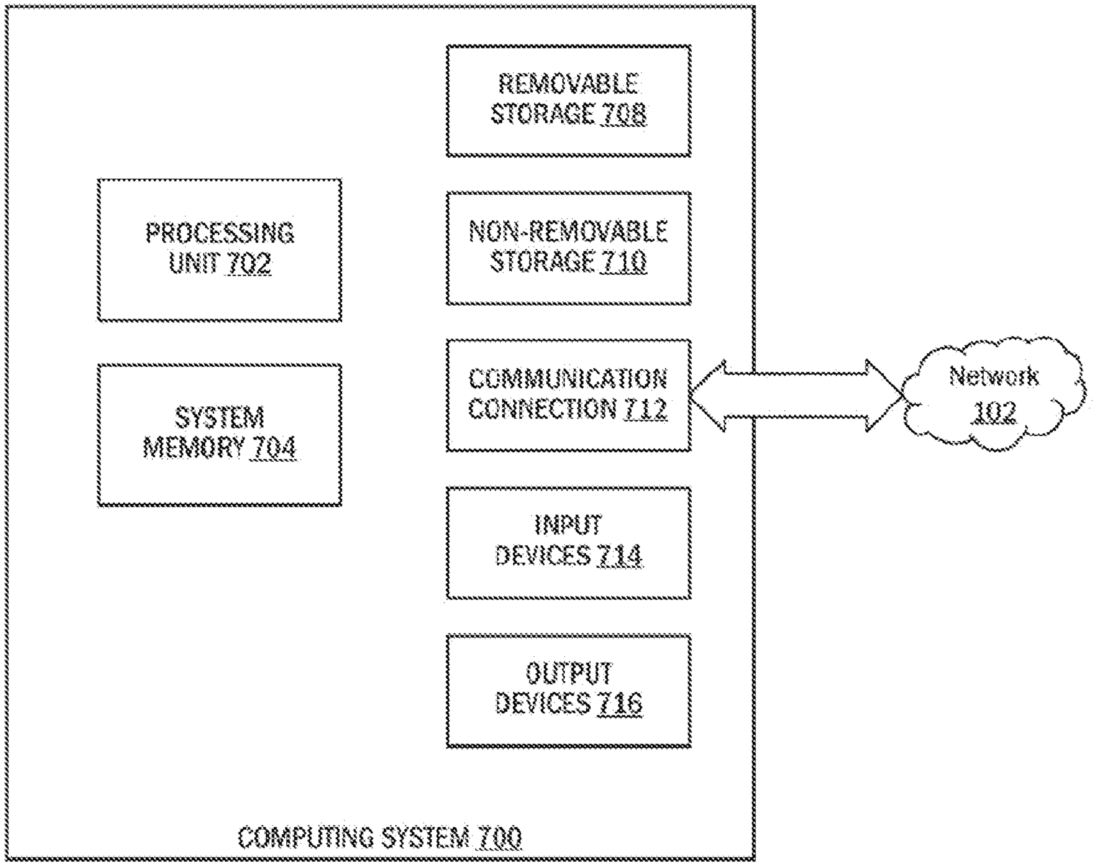
FIG. 7 illustrates an example computing system with which one or more of the disclosed examples can be implemented.

FIG. 7 illustrates an example of a suitable computing system 700 with which one or more of the disclosed examples can be implemented. Other computing systems, environments, or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like. In examples, the recipient computing device 120, the clinician computing device 130, and the feedback server 140 includes one or more components or variations of components of the computing system 700. Further, in some examples, the auditory prosthesis 110 includes one or more components of the computing system 700.

In its most basic configuration, computing system 700 typically includes at least one processing unit 702 and memory 704. Depending on the exact configuration and type of computing device, the memory 704 (storing, among other things, instructions to implement and/or perform the modules and methods disclosed herein) can be volatile (such as RAM (Random-Access Memory)), non-volatile (such as ROM (Read-Only Memory), flash memory, etc.), or some combination of the two. The system 700 can also include storage devices (removable, 708, and/or non-removable, 710) including, but not limited to, magnetic or optical disks or tape. Similarly, the system 700 can also include one or more input devices 714 such as touch screens, keyboard, mouse, pen, and voice input devices, among others. The system 700 can include one or more output devices 716 such as a display, a speaker, and a printer, among others. Also included in the environment can be one or more communication connections 712, such as LAN (Local Area Network), WAN (Wide Area Network), point-to-point, BLUETOOTH, and RF (Radiofrequency), among others.

The computing system 700 typically includes at least some form of computer readable media. A computer readable media is any media accessible by the processing unit 702. In examples, the computer readable media can include computer storage media and communication media. Computer storage media includes volatile and nonvolatile, removable and non-removable media implemented in any method or technology for storage of information such as computer readable instructions, data structures, program modules or other data. Examples of computer storage media include RAM, ROM, EEPROM (Electronically-Erasable Programmable Read-Only Memory), flash memory or other memory technology, optical disc storage, magnetic disc storage or other magnetic storage devices, solid state storage, or any other tangible or non-transitory medium which usable to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The computing system 700 can be a single device operating in a networked environment over communication links to one or more remote devices. The remote device can be an auditory prosthesis (e.g., the auditory prosthesis 110), a personal computer, a server, a router, a network personal computer, a peer device or other common network node. The communication links can include any method supported by available communications media and include weird or wireless connections or combinations thereof.

In examples, the components described herein comprise such modules or instructions executable by computing system 700 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 700 is part of a network that stores data in remote storage media for use by the computer system 700.

As should be appreciated, while particular uses of the technology have been illustrated and discussed above, the disclosed technology can be used with a variety of devices in accordance with many examples of the technology. The above discussion is not meant to suggest that the disclosed technology is only suitable for implementation within systems akin to that illustrated in the figures. For examples, while certain technologies described herein were primarily described in the context of auditory prostheses (e.g., cochlear implants), technologies disclosed herein are applicable to medical devices generally (e.g., medical devices providing pain management functionality or therapeutic electrical stimulation, such as deep brain stimulation). In general, additional configurations can be used to practice the methods and systems herein and/or some aspects described can be excluded without departing from the methods and systems disclosed herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system, comprising:

memory; and one or more processors configured to:

obtain medical device sensor data produced by at least one medical device sensor associated with a medical device, wherein the medical device is worn by, or at least partially implanted in, a recipient, determine an inquiry based on the medical device sensor data, provide the inquiry to the recipient via a recipient computing device, obtain inquiry response data submitted in response to the inquiry from the recipient computing device, store the inquiry response data, determine a target behavior for the recipient based on the medical device sensor data and the inquiry response data, and determine an incentive for the target behavior.

2. The system of claim 1, wherein the one or more processors are configured to:

initiate generation of a notification to the recipient with a description of the incentive.

3. The system of claim 2, wherein the one or more processors are configured to:

monitor for a change in operation of the medical device that satisfies the target behavior; and responsive to determining that the change in the operation of the medical device that satisfies the target behavior occurred, fulfilling the incentive.

4. The system of claim 1, wherein the target behavior is operating the medical device with a particular medical device setting.

5. The system of claim 1, wherein the medical device is a hearing device, and wherein the at least one medical device sensor comprises at least one sensor in the hearing device that is selected from a group consisting of: a microphone, an antenna, a telecoil, and a scene classifier.

6. The system of claim 1, wherein the medical device sensor data includes scene classifier data.

7. The system of claim 1, wherein the target behavior is operating the medical device within a particular environment.

8. The system of claim 1, wherein the recipient computing device comprises at least one recipient computing device sensor, and wherein the one or more processors are configured to:

obtain recipient computing device sensor data produced by the at least one recipient computing device sensor; and determine the target behavior further based on the recipient computing device sensor data.

9. The system of claim 8, wherein the at least one recipient computing device sensor or the at least one medical device sensor comprises at least one sensor selected from the group consisting of:

an accelerometer, a gyroscope sensors, a wirelessly-connected device, a data stream sensor, a location sensor, a biosensor, and a light sensor.

10. A method comprising:

obtaining hearing device sensor data produced by at least one hearing device sensor of a hearing device that is at least one of worn by or at least partially implanted in a recipient;

obtaining recipient computing device sensor data produced by at least one recipient computing device sensor of a recipient computing device used by the recipient;

determining a target behavior based on the hearing device sensor data and the recipient computing device sensor data;

determining an incentive for the target behavior; and causing the recipient computing device to provide a notification, wherein the notification includes a description of the incentive.

11. The method of claim 10, wherein determining the target behavior includes selecting the target behavior at random from a plurality of target behaviors.

12. The method of claim 10, further comprising:

determining an inquiry for the recipient based on the hearing device sensor data and the recipient computing device sensor data;

causing the recipient computing device to provide the inquiry to the recipient;

obtaining inquiry response data from the recipient computing device; and storing the inquiry response data, wherein determining the target behavior is based on the stored inquiry response data.

13. The method of claim 12, further comprising:

determining, based on the recipient computing device sensor data or the hearing device sensor data, an occurrence of an auditory event having characteristics above a threshold; and storing data regarding the occurrence, wherein determining the inquiry for the recipient is based on the occurrence.

14. The method of claim 10, wherein determining the incentive is based on a prior incentive.

15. The method of claim 10, wherein the hearing device is a hearing prosthesis, and wherein obtaining hearing device sensor data comprises:

obtaining data from a hearing prosthesis sensor of the hearing prosthesis.

16. One or more non-transitory computer readable media comprising instructions that, when executed by one or more processors, cause the one or more processors to perform operations, including:

automatically obtaining first system data regarding a medical device of a recipient from a recipient computing device of the recipient;

evaluating the first system data;

determining that the first system data does not satisfy a threshold; and responsive to determining that the first system data does not satisfy the threshold, providing an indication of an incentive to the recipient.

17. The one or more non-transitory computer readable media of claim 16, wherein the operations further include:

automatically obtaining second system data from the recipient computing device;

evaluating the second system data;

determining that the second system data satisfies the threshold; and responsive to determining that the second system data satisfies the threshold, fulfilling the incentive.

18. The one or more non-transitory computer readable media of claim 16, wherein obtaining the first system data includes obtaining:

data regarding an amount of time that the medical device operated with particular medical device settings; and data regarding an amount of time that the medical device operated in a particular environment.

19. The one or more non-transitory computer readable media of claim 16, wherein evaluating the first system data includes:

comparing the first system data with baseline operation data.

20. The one or more non-transitory computer readable media of claim 16, wherein the operations further include:

setting the threshold based on clinician feedback received from a clinician computing device.

21. The one or more non-transitory computer readable media of claim 16, wherein determining that the first system data does not satisfy the threshold comprises:

determining that the medical device operated with selected settings for less than a target amount of time.

* * * * *